No. 842,088. PATENTED JAN. 22, 1907.
J. R. ELFRETH.
DEVICE FOR SUPPLYING A FILTER OR OTHER RECEIVER WITH
CHEMICALLY TREATED FLUID.
APPLICATION FILED JUNE 22, 1906.

Witnesses
P. F. Nagle
L. Douville

Inventor
Jacob R. Elfreth
By Wiedersheim & Fairbanks
Attorneys

UNITED STATES PATENT OFFICE.

JACOB R. ELFRETH, OF PHILADELPHIA, PENNSYLVANIA.

DEVICE FOR SUPPLYING A FILTER OR OTHER RECEIVER WITH CHEMICALLY-TREATED FLUID.

No. 842,088.     Specification of Letters Patent.     Patented Jan. 22, 1907.

Application filed June 22, 1906. Serial No. 322,870.

*To all whom it may concern:*

Be it known that I, JACOB R. ELFRETH, a citizen of the United States, residing in the city and county of Philadelphia, State of Pennsylvania, have invented a new and useful Device for Supplying a Filter or other Receiver with Chemically-Treated Fluid, of which the following is a specification.

My invention relates to a device for supplying a filter or other receiver with chemically-treated fluid; and it consists in providing the pipe which supplies said filter or receiver with unfiltered water or fluid, with means for causing a quantity of such water to enter a chamber which contains a coagulant or chemical or purifying material, so as to be impregnated with a certain quantity of said material, in which condition it is caused to rejoin the water running to the filter or receiver, and so act on the latter to purify it.

Figure 1:
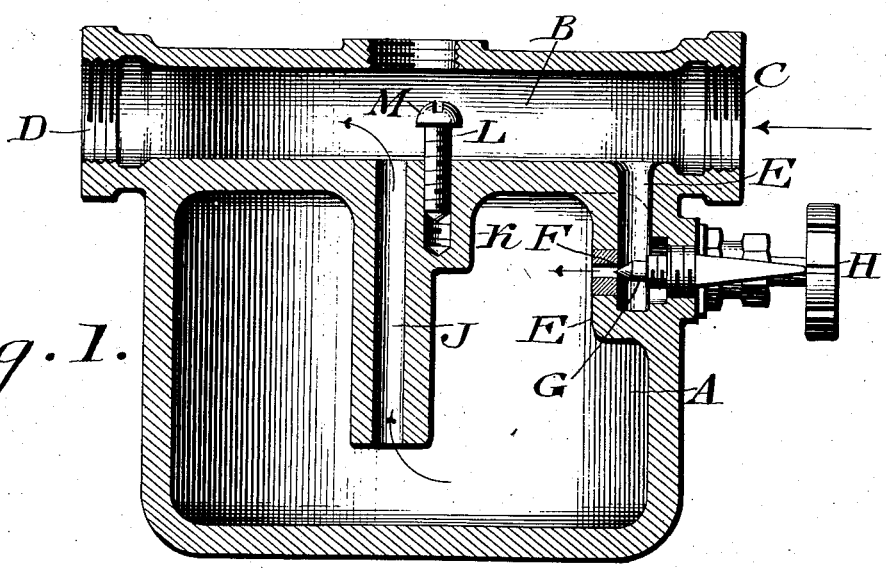
Figure 2:
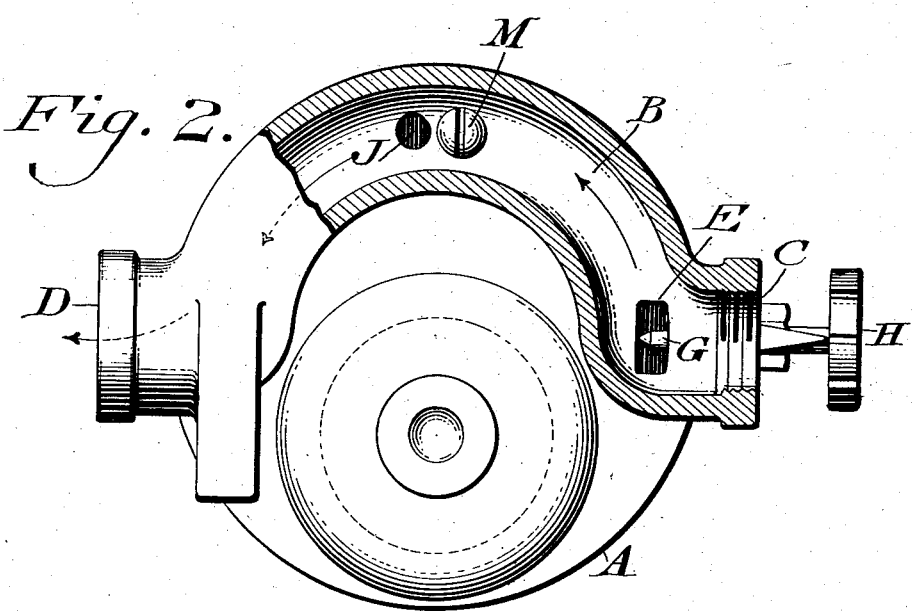

Figure 1 represents a vertical section of a chemical feeder for purifying water or fluid embodying my invention. Fig. 2 represents a partial plan view and partial horizontal section thereof.

Similar letters of reference indicate corresponding parts in the figures.

Referring to the drawings, A designates a tank or vessel adapted to contain a coagulant or chemical or other material adapted to purify or treat water or other fluid. Connected with said vessel is the water-supply passage or tube B, whose inlet C is adapted to be connected with a source of supply of water or fluid in primary condition and whose outlet D is adapted to be connected with a filter or other receiver.

Depending from the top of the vessel A is the by-pass E, which is in communication with the passage B and has in its inner side the seat F for the valve G, the stem of which passes through the wall of said vessel and is provided with a handled wheel H, said seat opening into the vessel A.

Depending from the top of said vessel is the discharge-tube J therefor, the same being in communication with the interior thereof and with the passage B. Depending also from said top is the boss K, whose bore is threaded and has engaging with it the screw L, whose head enters the passage B and forms in a measure an obstruction to the flow of the water or fluid therethrough.

The construction of the top of the vessel A is such that the portion of the same below the passage B constitutes the under wall of said passage, said parts being cast together, although, as is evident, the passage B may be formed separate from the vessel A and connected therewith in any suitable manner.

The operation is as follows: Water or fluid in normal condition is admitted into the passage B and the valve G opened to the required extent relatively to the amount of fluid that may be desired to enter the vessel A. The screw L is also adjusted to the required height, so as to present itself in the path of the running water in the passage B, so that a portion of the same impacts itself against the head or upper part of the screw, or both, said portion thus being obstructed and checked and directed backwardly, so as to flow into the by-pass E, from whence it passes through the valve and enters the vessel A, where it mingles with the coagulant, chemical, or other material to purify or treat the water or fluid and is impregnated by the same. It then escapes through the tube J, and so reaches the passage B in front of the screw L, where it joins the running water and mixes therewith, in which condition the water enters the filter or the other vessel to which it may be directed.

It will be seen that the water or fluid when treated rejoins the water or fluid running to the filter or other receiver in a certain definite, predetermined, and variable quantity bearing always a certain and definite relation to said water or other fluid proportionate to the amount of said water or other fluid passing through the pipe or way.

It will be noted that the retarding device L is independent of the regulating-valve and that said valve is placed within the vessel so as to avoid placing the same in the passage B. The said valve being on the depending boss within the vessel admits of quickly turning on and cutting off the liquid at the vessel, and yet the untreated water may run through the passage B, if desired. The valve B and the retarding device L are entirely independent of each other and independently operable.

Having thus described my invention, what I claim as new, and desire to secure by Letters Patent, is—

1. In a device of the character stated, a vessel adapted to receive a coagulant, chemical or purifying material, a conveyer or way for water or other fluid to a place of reception adapted to be placed in communication with said vessel, a discharge-pipe depending within the vessel and communicating with said way, said vessel having a filling-opening, and means in said way for retarding the flow of a portion of said water or fluid entering said way and directing or diverting a certain, definite predetermined amount of said water or other fluid into said vessel, said depending tube and retarding means both being accessible through said filling-opening.

2. In a device of the character stated, a vessel adapted to receive a coagulant, chemical or purifying material, a conveyer or way for water or other fluid to a place of reception adapted to be placed in communication with said vessel, a discharge-pipe depending within the vessel and communicating with said way, said vessel having a filling-opening, means in said way for retarding the flow of a portion of said water or fluid entering said way and directing or diverting a certain definite, predetermined amount of said water or other fluid into said vessel, said depending tube and retarding means both being accessible through said filling-opening, a by-pass from said way to said vessel, and a valve independent of said retarding means and located within said vessel.

3. In a device of the character stated, a vessel adapted to receive a coagulant, chemical or other purifying material and having formed integral therewith a curved way for water or other fluid, a discharge-pipe depending within said vessel and communicating with said way, an adjustable retarding device supported within the vessel and extending into said way, a by-pass intermediate of the entrance end of the conveyer and the vessel and located within the latter, and a valve disposed within the vessel and independent of said retarding device for controlling the outlet from said by-pass into the vessel.

4. In a device of the character stated, a vessel adapted to receive a coagulant, chemical or other purifying material and having formed integral therewith a curved way for water or other fluid, a discharge-pipe depending within said vessel and communicating with said way, an adjustable retarding device supported within the vessel and extending into said way, a by-pass intermediate of the entrance end of the conveyer and the vessel and located within the latter, and a valve disposed within the vessel and independent of said retarding device for controlling the outlet from said by-pass into the vessel, said valve being disposed within the vessel outside of said way and operable independently of the retarding device.

5. In a device of the character stated, a vessel having a filling-opening, a conveyer for a liquid adapted to be placed in communication with said vessel, a valve within the communication between said vessel and conveyer and outside of said conveyer, an adjustable device in said conveyer for retarding the flow of liquid entering said conveyer and directing or diverting a certain predetermined amount of said liquid into said vessel through said communication the head of said device being accessible through said opening, and an outlet from said vessel into said conveyer upon the opposite side of said retarding device.

6. In a device of the character stated, a vessel formed with a supply-passage, a depending tube leading therefrom into the vessel, a retarding device in said passage, a by-pass independent of said tube, and a valve in said by-pass within the vessel and out of said passage said device being adjustably supported on the base-wall of said passage intermediate of the ends thereof and having its head occupying part of said passage.

7. In a device of the character stated, a vessel formed with a supply-passage, a depending tube leading therefrom into the vessel, a boss integral with said tube within the vessel, a retarding device in said passage and adjustable in said boss, a by-pass independent of said tube, and a valve in said by-pass, within the vessel and out of said passage.

JACOB R. ELFRETH.

Witnesses:
JOHN A. WIEDERSHEIM,
S. R. CARR.